United States Patent
Hulbert

(10) Patent No.: US 9,350,436 B2
(45) Date of Patent: May 24, 2016

(54) WIRELESS POLARIZATION MODULATION METHOD USING POLARIZATION SHIFT KEYING AND HADAMARD MULTIPLEXING

(71) Applicant: The United States of America as represented by the Secretary of the Navy, San Diego, CA (US)

(72) Inventor: Douglas S. Hulbert, San Diego, CA (US)

(73) Assignee: THE UNITED STATES OF AMERICA AS REPRESENTED BY THE SECRETARY OF THE NAVY, Washington, DC (US)

(*) Notice: Subject to any disclaimer, the term of this patent is extended or adjusted under 35 U.S.C. 154(b) by 214 days.

(21) Appl. No.: 14/283,096

(22) Filed: May 20, 2014

(65) Prior Publication Data
US 2015/0341133 A1 Nov. 26, 2015

(51) Int. Cl.
*H04B 7/06* (2006.01)
*H04B 7/08* (2006.01)
*H04B 7/10* (2006.01)
H04B 1/7105 (2011.01)
H04B 1/7103 (2011.01)
H04B 7/04 (2006.01)

(52) U.S. Cl.
CPC ............ *H04B 7/0634* (2013.01); *H04B 7/0615* (2013.01); *H04B 7/0842* (2013.01); *H04B 7/10* (2013.01); *H04B 1/7103* (2013.01); *H04B 1/71052* (2013.01); *H04B 7/0413* (2013.01)

(58) Field of Classification Search
CPC ............ H04B 1/7103; H04B 1/71052; H04B 7/0634; H04B 7/0413; H04L 25/03114; G06F 17/145
See application file for complete search history.

(56) References Cited

U.S. PATENT DOCUMENTS

| 5,410,538 A | 4/1995 | Roche et al. |
| 8,144,808 B2 * | 3/2012 | Clerckx ............... H04B 7/0413 375/267 |
| 8,385,470 B2 | 2/2013 | Gossett et al. |

(Continued)

OTHER PUBLICATIONS

Sinclair, G., "The Transmission and Reception of Elliptically Polarized Waves," Proc. of the Institute of Radio Engineers, vol. 38, pp. 148-151, 1950.

(Continued)

*Primary Examiner* — Raj Jain
(74) *Attorney, Agent, or Firm* — SPAWAR Systems Center Pacific; Kyle Eppele; Ryan J. Friedl

(57) ABSTRACT

A method involves modulation of polarization states at a radio network's transmit antennas and configuration of complementary polarization states at the radio network's receiving antennas such that variations in measured voltages at receivers' antennas convey digital information and provide a multiple access channel to supplement other network communications. A calibration interval may be used, during which the network receivers measure the two distinct voltages from each transmitter during separate time intervals. Each receiver keeps a separate accumulation for each transmitter wherein each received sample is weighted by +1 or −1 according to the column of a Hadamard matrix. After the sample periods and accumulations have been completed, each receiver offsets its accumulation using a normalization term. Each receiver may then decode bits received from each transmitter using the offset completed sum for each respective transmitter.

17 Claims, 4 Drawing Sheets

(56) References Cited

U.S. PATENT DOCUMENTS

| | | |
|---|---|---|
| 2007/0279284 A1 | 12/2007 | Narayanan |
| 2010/0091134 A1* | 4/2010 | Cooke ................ H04N 5/23245 348/229.1 |
| 2012/0320834 A1* | 12/2012 | Branlund ........... H04B 1/71052 370/328 |
| 2014/0211039 A1* | 7/2014 | Herman .................... G06T 9/00 348/222.1 |
| 2015/0222458 A1* | 8/2015 | Hormati ............ H04L 25/03343 375/257 |

OTHER PUBLICATIONS

Karbassian, M.M., and Ghafouri-Shiraz, H., "Transceiver Architecture for Incoherent Optical CDMA Networks Based on Polarization Modulation," Journal of Lightwave Technology, vol. 26, No. 24, 2008.

Benedetto, S. and Poggiolini, P., "Theory of Polarization Shift Keying Modulation," IEEE Trans. on Comm., vol. 40, No. 4, 1992.

\* cited by examiner

WIRELESS POLARIZATION MODULATION METHOD USING POLARIZATION SHIFT KEYING AND HADAMARD MULTIPLEXING

FEDERALLY SPONSORED RESEARCH AND DEVELOPMENT

The Wireless Polarization Modulation Method Using Polarization Shift Keying and Hadamard Multiplexing is assigned to the United States Government. Licensing inquiries may be directed to Office of Research and Technical Applications, Space and Naval Warfare Systems Center, Pacific, Code 72120, San Diego, Calif., 92152; telephone (619) 553-5118; email: ssc_pac_t2@navy.mil. Reference Navy Case No. 102578.

BACKGROUND

Radio communications networks using multiple access techniques are susceptible to issues such as multiple access interference. Further, as methods of communication over such networks are limited, a method to provide an additional informational channel over a radio communication network that is not susceptible to multiple access interference is desirable.

DETAILED DESCRIPTION OF SOME EMBODIMENTS

Reference in the specification to "one embodiment" or to "an embodiment" means that a particular feature, structure, or characteristic described in connection with the embodiments is included in at least one embodiment of the invention. The appearances of the phrases "in one embodiment", "in some embodiments", and "in other embodiments" in various places in the specification are not necessarily all referring to the same embodiment or the same set of embodiments.

The embodiments of the system and method disclosed herein provide a multiple access scheme for a radio network based on the modulation of polarization states at a network's transmit antennas and configuration of complementary polarization states at the network's receiving antennas such that variations in measured voltages at receivers' antennas can, among other purposes, convey digital information and provide a multiple access channel to supplement other network communications.

In some embodiments, the modulation of polarization states if used, for example, to supply an additional channel of information flow, occurs without interfering with or otherwise encumbering the frequency or amplitude modulations of the incumbent waveform. An alternative approach involves providing an un-modulated waveform on which polarization states are induced at the transmitting antenna, with polarization modulation providing the sole channel for information flow.

Figure 1:
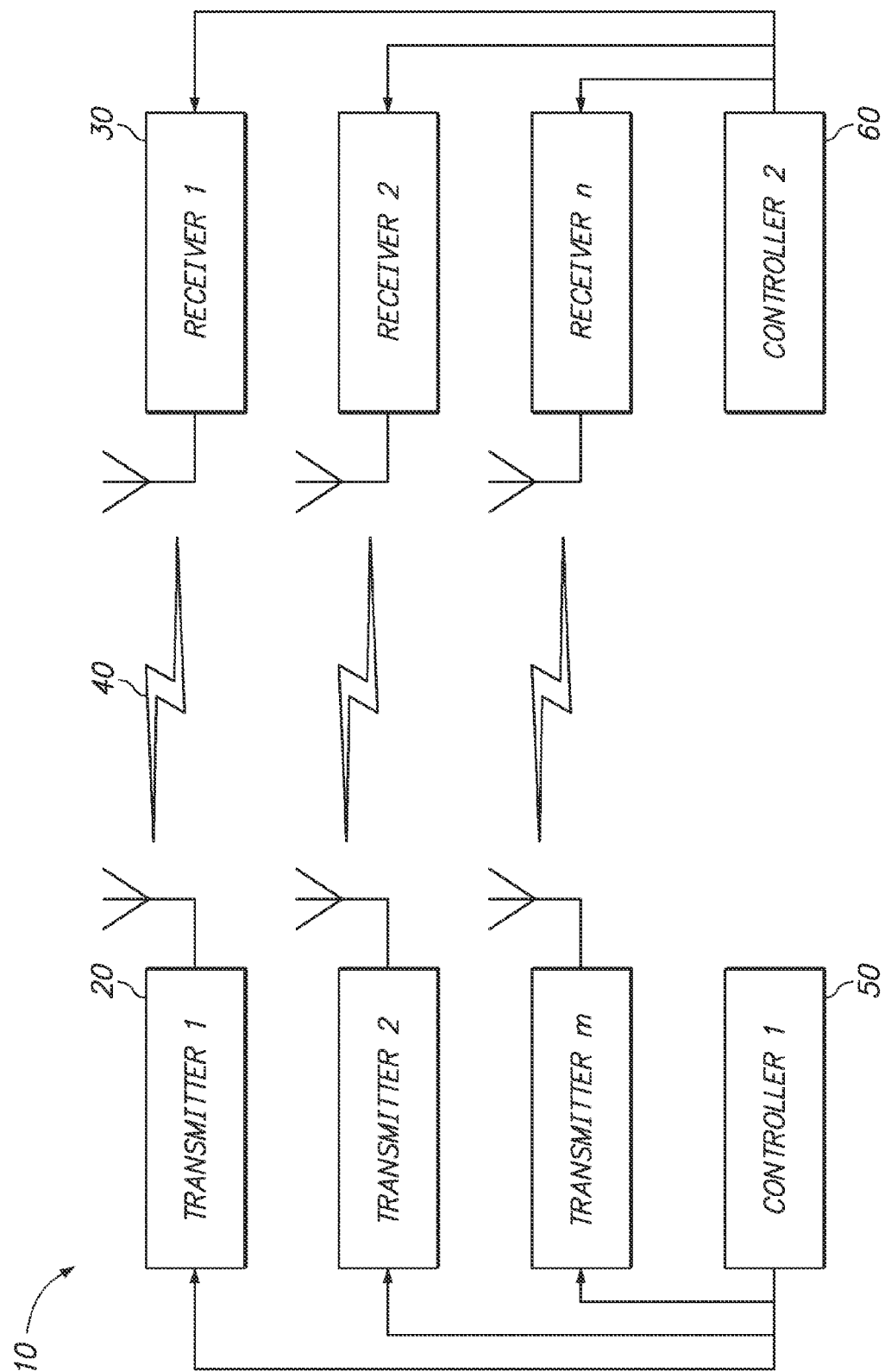
FIG. 1 shows a block diagram of an embodiment of a system in accordance with the Wireless Polarization Modulation Method Using Polarization Shift Keying and Hadamard Multiplexing.

FIG. 1 shows a block diagram of an embodiment of a system 10 in accordance with the Wireless Polarization Modulation Method Using Polarization Shift Keying and Hadamard Multiplexing. System 10 includes one to m transmitters 20 and one to n receivers 30 that form a radio communications network for the transmission/reception of radio signals 40. In some embodiments, the number of transmitters 20 are less than or equal to the number of measurement intervals discussed below. Transmitters 20 are operatively connected to controller 50 and receivers 30 are operatively connected to controller 60. The antennas of transmitters 20 and the antennas of receivers 30 are oriented in such a way that each transmitting antenna induces measurably distinct voltages at the output of each receiving antenna by switching between two or more polarization states. The collective effects of transmitters' 20 polarizations at each receiving antenna may be sufficiently modeled as an additive superposition.

The transmitting and receiving antennas collectively have a means to synchronize the switching of their polarizations. In some embodiments this may occur via coordination of the antennas using, respectively, controllers 50 and 60. In some embodiments, to address synchronization problems, codes with very low cross-correlation, such as Gold codes, may be used. As an example, the polarization states are linear polarization, horizontal or vertical, and right-hand or left-hand circular polarization. Further, the choice of polarization state pairs used may be varied to best exploit environmental conditions.

In some embodiments, the method disclosed herein uses a calibration interval during which the network receivers measure the two distinct voltages from each transmitter during separate time intervals. In some embodiments, complex-valued measurements of voltages (two-dimensional quantities to register magnitudes and relative phase) may be used to increase throughput. After the calibration interval, each receiver keeps a separate accumulation for each transmitter wherein each received sample is weighted by +1 or −1 according to the column of a Hadamard matrix that is associated with the given transmitter. After the sample periods and accumulations have been completed, each receiver then offsets its accumulation using a normalization term.

A far-field radiator induces a cross-range electric field of $(E_\theta, E_\phi \exp(j\delta_1))$ at a receive antenna whose effective length along line of sight is equal to $(h_\theta, h_\phi \exp(j\delta_2))$; the resulting antenna terminal voltage is equal to the following Hermitian inner product:

$$V = h_\theta E_\theta + h_\phi E_\phi e^{j(\delta_1 - \delta_2)}. \tag{Eq. 1}$$

By modulating its transmitted polarization, a transmitting node can effect changes to the values of $\delta_1$ or $(E_\theta, E_\phi)$ at each receiver of interest, causing the two complex terms of V to increase, or to decrease the resultant magnitude of the sum. The difference in magnitude between these alternating voltage levels provides a signaling opportunity.

In some embodiments, the signaling method disclosed herein uses a calibration interval during which the receivers in a network measure these two voltages from each transmitter individually. During the measurement interval for transmitter n, receiver m measures two voltage levels. If $c_0$ is the average of the two measurements and $\Delta(m,n)>0$ is half the difference, then the two measurements can be written as $$c_0(m,n)+d(n)\Delta(m,n) \quad \text{(Eq. 2)}$$

and $$c_0(m,n)-d(n)\Delta(m,n) \quad \text{(Eq. 3)}$$

where $d(n)=1$ for one measurement and $d(n)=-1$ for the other. During the calibration interval, receiver m computes $c_0(m,n)$ and $\Delta(m,n)$ for each transmitter n to assist in later estimates of $d(n)$, the signaling variable. After the end of the calibration interval, each receiver proceeds to measure a superposition of induced voltages from several transmitters and form estimates of $d(n)$ where n varies over all transmitters.

A Hadamard matrix H is a square matrix in which each entry is either 1 or $-1$ and whose rows are mutually orthogonal, so that $$HH^T = N \cdot I_{N \times N} \quad \text{(Eq. 4)}$$

where $I_{N \times N}$ is the N-by-N identity matrix. In this Hadamard-based protocol, each network node has knowledge of a common matrix H. As an example, the following simple induction shows how to construct Hadamard matrices for any N that is a power of two:

$$H_1 = [1], \quad \text{(Eq. 5)}$$

$$H_2 = \begin{bmatrix} 1 & 1 \\ 1 & -1 \end{bmatrix},$$

and $$H_{2^k} = \begin{bmatrix} H_{2^{k-1}} & H_{2^{k-1}} \\ H_{2^{k-1}} & -H_{2^{k-1}} \end{bmatrix}$$

for $k \geq 2$

After calibration is completed, the operator at transmitter $n_0$ wants to broadcast $d(n_0)=-1$ or $d(n_0)=1$; the operator sequences through N intervals, holding $d(n_0)$ constant while varying the signal at time index k according to $H(n_0,k)$. More specifically, this transmission produces the following voltage at receiver m:

$$V(m,n_0,k) = c_0(m,n_0) + d(n_0)H(n_0,k)\Delta(m,n_0) \quad \text{(Eq. 6)}$$

Simultaneously, receiver $m_0$ keeps a running sum for each transmitter n by accumulating the received signal in each interval k, but first multiplying by 1 or $-1$ according to $H(n,k)$. At the end of N intervals, receiver $m_0$ has a completed sum for transmitter $n_0$ equal to $$V_{RCV}(m_0, n_0) = \sum_{k=1}^{N} \left( H(n_0, k) \sum_{n=1}^{N} V(m_0, n, k) \right) \quad \text{(Eq. 7)}$$

$$= \sum_{k=1}^{N} H(n_0, k) \sum_{n=1}^{N} (c_0(m_0, n) + d(n)H(n, k)\Delta(m_0, n))$$

$$= \left( \sum_{n=1}^{N} c_0(m_0, n) \right).$$

-continued $$\sum_{k=1}^{N} H(n_0, k) + \sum_{n=1}^{N} d(n) \left( \sum_{k=1}^{N} H(n_0, k)H(n, k) \right) \Delta(m_0, n)$$

At each receiver, the first term can be computed during calibration from the assembled measurements and the known entries of H. After subtracting this first term, the second term collapses because of the properties of Hadamard matrices. Hence, $$V_{NORM}(m_0, n_0) = V_{RCV}(m_0, n_0) - \left( \sum_{n=1}^{N} c_0(m_0, n) \right) \sum_{k=1}^{N} H(n_0, k) \quad \text{(Eq. 8)}$$

$$= \sum_{n=1}^{N} d(n) \left( \sum_{k=1}^{N} H(n_0, k)H(n, k) \right) \Delta(m_0, n)$$

$$= \sum_{n=1}^{N} d(n)(N \cdot \delta(n = n_0)) \Delta(m_0, n)$$

where $\delta(n=n_0)=1$ if $n=n_0$ and 0 otherwise. Simplifying, $$V_{NORM}(m_0, n_0) = N \cdot \Delta(m_0, n_0) \text{ if } d(n_0)=1 \quad \text{(Eq. 9)}$$

and $$V_{NORM}(m_0, n_0) = -N \cdot \Delta(m_0, n_0) \text{ if } d(n_0)=-1 \quad \text{(Eq. 10)}$$

It is noted that the difference between the expected values of the signal variables increases linearly with N.

Figure 2:
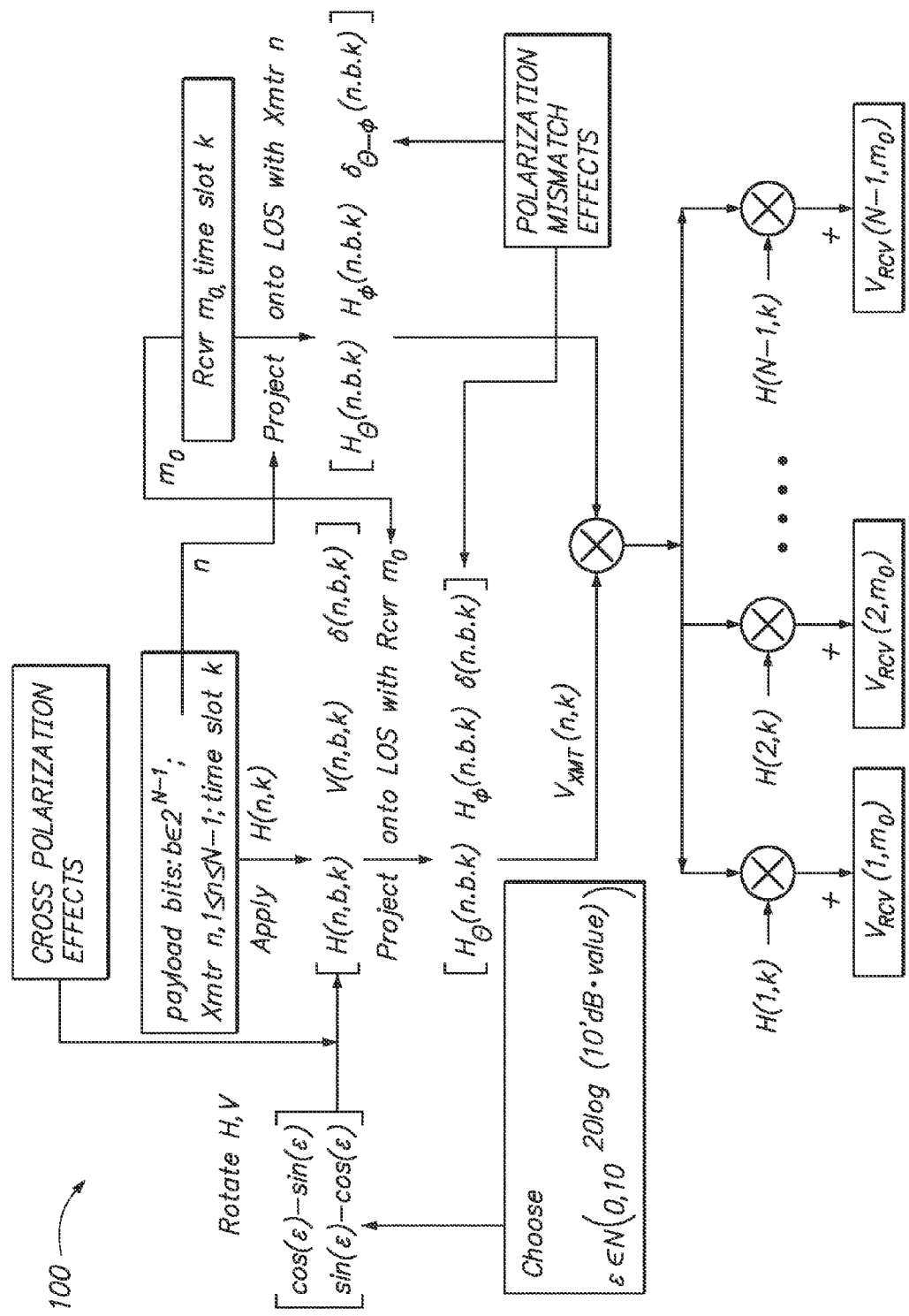
FIG. 2 shows a flowchart of an embodiment of a simulated method in accordance with the Wireless Polarization Modulation Method Using Polarization Shift Keying and Hadamard Multiplexing.

The feasibility of the above protocol was studied using Monte Carlo simulation, which resulted in development of equations for the polarization loss (or polarization mismatch) factor among transceiver pairs of antennas, a model of cross-polarization effects, and a simulation flow chart (see FIG. 2). The decision to use a Monte Carlo simulation instead of a statistical model for analysis is based on the model of cross polarization used. In the model, crossover from one polarization to its orthogonal polarization is modeled as a normal random process with a specified variation, while preserving total energy.

The polarization representation in antenna coordinates is projected onto basis vectors in the plane normal to the line of sight. Using trigonometric identities, these new coordinates and the new phase difference defining far-field polarization along the line of sight can be expressed:

$$P_{\theta-\varphi}(\vec{V}) = \begin{bmatrix} 0 & 1 & 0 \\ 0 & 0 & 1 \end{bmatrix} \begin{bmatrix} \sin\theta\cos\varphi & \sin\theta\sin\varphi & \cos\theta \\ \cos\theta\cos\varphi & \cos\theta\sin\varphi & -\sin\theta \\ -\sin\varphi & \cos\varphi & 0 \end{bmatrix} \quad \text{(Eq. 11)}$$

$$\begin{bmatrix} E_1 \sin\omega t \\ E_2 \sin(\omega t + \delta) \\ 0 \end{bmatrix}$$

$$P_{\theta-\varphi}(\vec{V}) = \begin{bmatrix} \sqrt{A^2+B^2} & 0 \\ 0 & \sqrt{C^2+D^2}\sin(\omega t + \alpha_2 - \alpha_1) \end{bmatrix}, \quad \text{(Eq. 12)}$$

where

-continued $$A = E_1\cos\theta\cos\varphi + E_2\cos\delta\cos\theta\sin\varphi, \quad \text{(Eq. 13)}$$
$$B = E_2\sin\delta\cos\theta\sin\varphi,$$
$$C = -E_1\sin\varphi + E_2\cos\delta\cos\varphi,$$
and
$$D = E_2\sin\delta\cos\varphi$$
where $$\alpha_1 = \tan^{-1}\left(\frac{B}{A}\right); \quad \text{(Eq. 14)}$$
$$\alpha_2 = \tan^{-1}\left(\frac{D}{C}\right).$$

Using (Eqs. 11-14), the Monte Carlo simulation translates the polarization expressed in antenna coordinates into polarization along a line of sight. In (Eq. 1), the receive antenna's effective length ($h_\theta$, $h_\phi\exp(j\delta_2)$) and the transmit antenna's induced polarization at the receive antenna ($E_\theta$, $E_\phi\exp(j\delta_1)$) are both derived from projections (Eqs. 11-14) onto the line of sight specified by $\theta$ and $\phi$.

Flow chart 100 shown in FIG. 2 depicts the generation of samples based on this approach, where random draws from a normal population result in rotations to preserve the sum of squares of the horizontal and vertical components. FIG. 2 shows the processing sequences used in the simulation to model random variations in cross polarization under the assumption that total transmitted energy is preserved, but passes from one axis of polarization to the other. Voltage notation in the figure reflects the development as set forth above.

Figure 3:
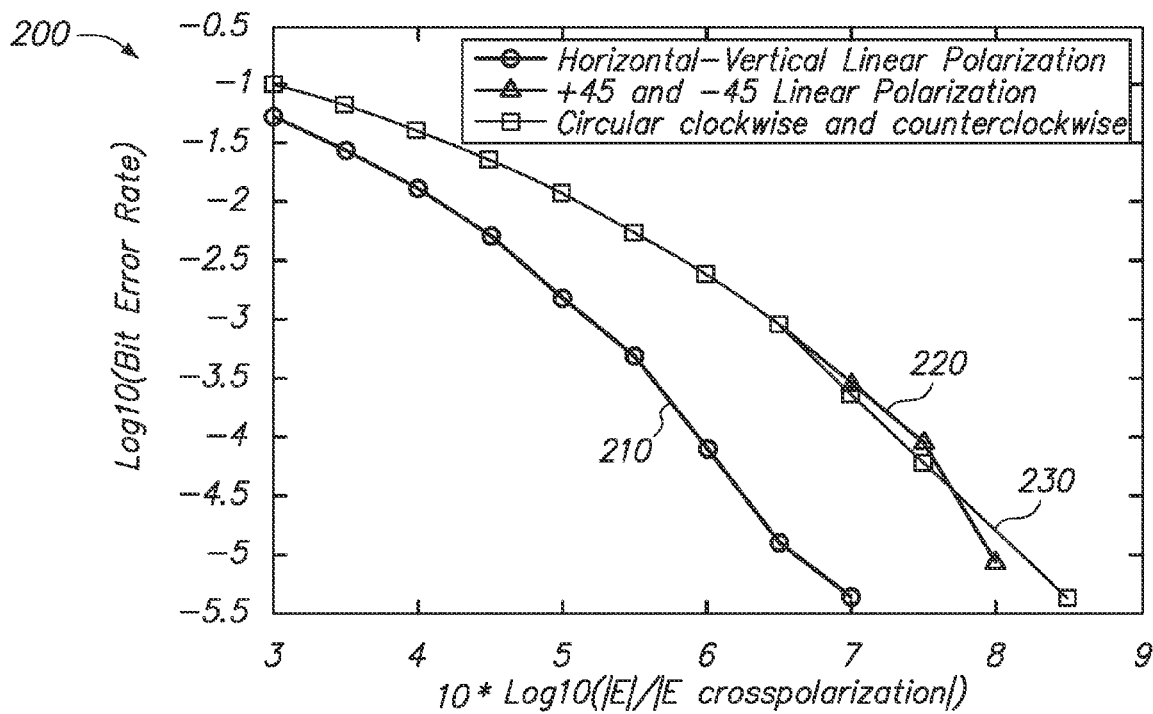
FIG. 3 shows a graph illustrating simulation results of bit error versus cross-polarization for three different polarization pairs for a four-node network.

FIG. 3 shows a graph 200 illustrating outputs of the Monte Carlo simulation, plotting bit error versus cross polarization for three different polarization pairs for a four-node network. As shown, line 210 represents polarization pairs of horizontal and vertical linear polarization, line 220 represents polarization pairs of +45 degrees and −45 degrees linear polarization, and line 230 represents polarization pairs of circular clockwise and counter-clockwise polarization. The horizontal-vertical polarization appears to perform better than the other two, perhaps because all four network nodes were placed at a common elevation and the energy conserving model for the leakage of field strength onto horizontal components did not affect the projected polarization states as much as with the circular and 45-degree polarization pairs.

Figure 4:
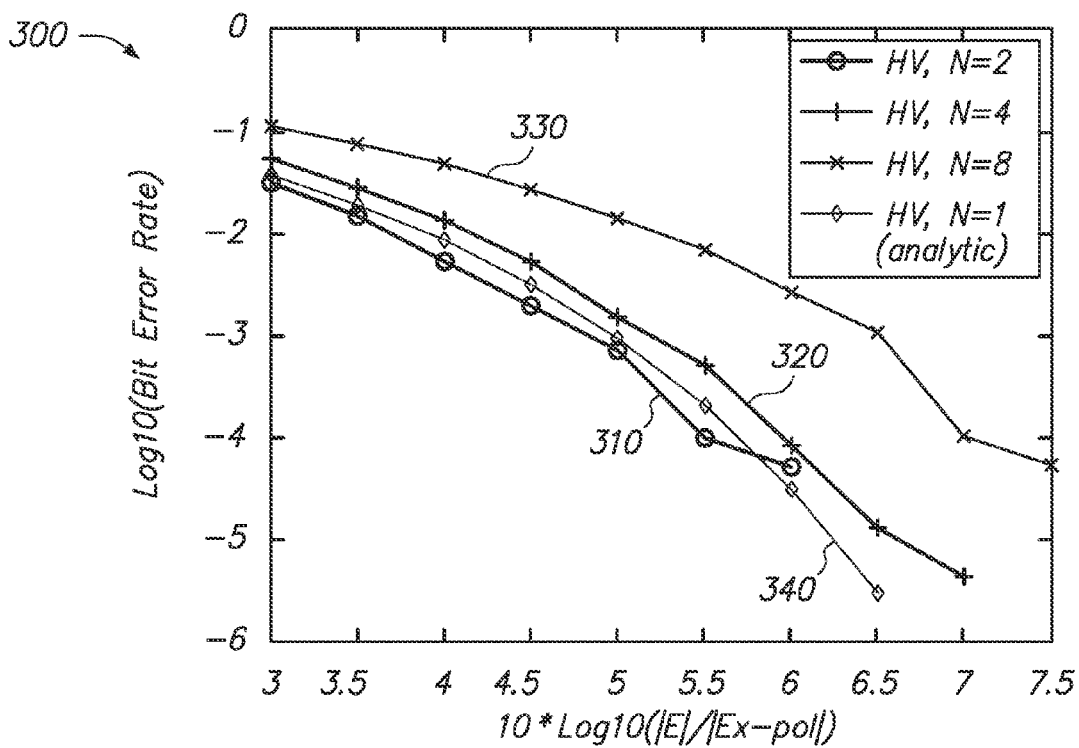
FIG. 4 shows a graph illustrating a comparison of bit error rate for networks of two, four, and eight nodes using linear polarization.

FIG. 4 shows a graph 300 illustrating a comparison of bit error rate for networks of two, four, and eight nodes using linear polarization, modulating horizontal and vertical. As shown, line 310 represents N=2, line 320 represents N=4, line 330 represents N=8, and line 340 represents N=1. The notation "N=1" does not refer to a network of one node, but rather to an analytically derived curve displaying the probability that a single antenna transmission with a given cross polarization variance would be misinterpreted by a receive antenna whose effective length experiences no cross-polarization. The increase in bit error rate with network size should be weighed against other factors. For instance, if the network size doubles, the bit transmission rate for each node is cut in half but the number of delivered bits per unit time doubles.

Figure 5:
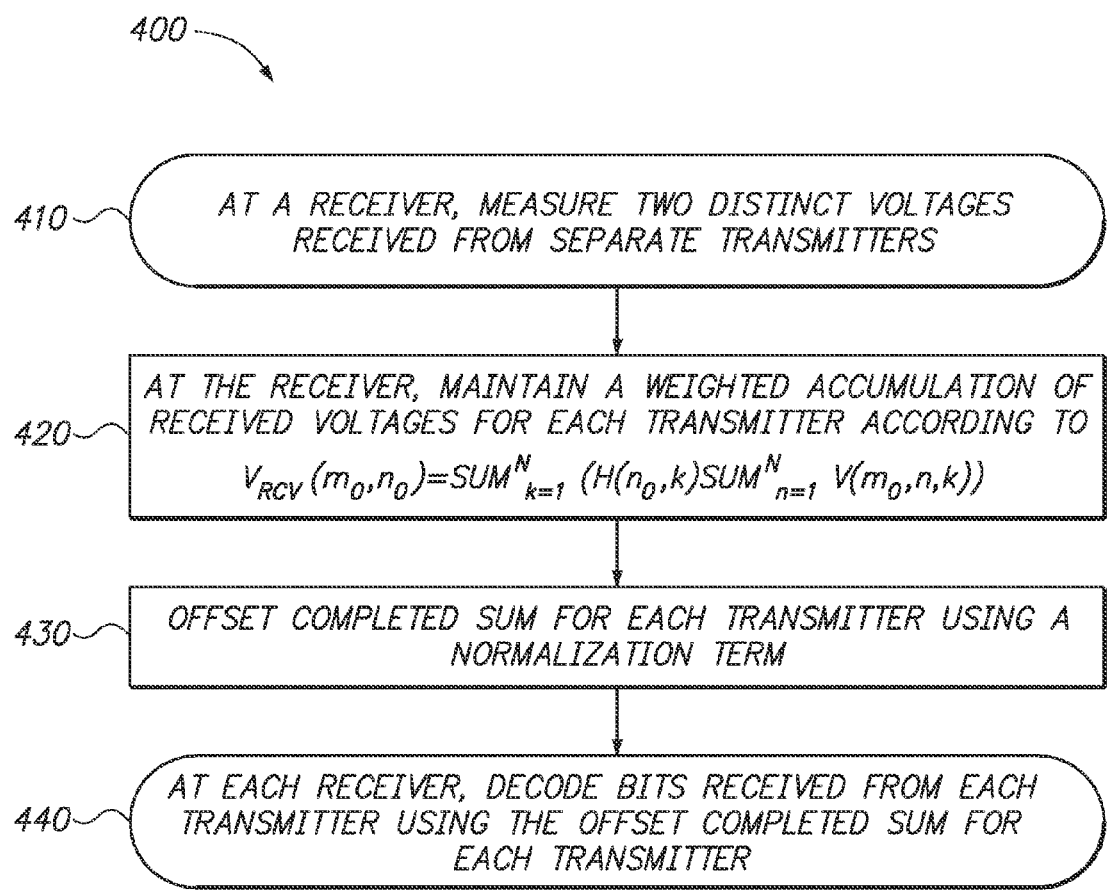
FIG. 5 shows a flowchart of an embodiment of a method in accordance with the Wireless Polarization Modulation Method Using Polarization Shift Keying and Hadamard Multiplexing.

FIG. 5 shows a flowchart of an embodiment of a method 400 in accordance with the Wireless Polarization Modulation Method Using Polarization Shift Keying and Hadamard Multiplexing. As an example, method 400 may be performed by system 10 as shown in FIG. 1 and will be discussed with reference thereto and its respective components. Further, while FIG. 5 shows one embodiment of method 400 to include steps 410-440, other embodiments of method 400 may contain fewer or more steps. Further, while in some embodiments the steps of method 400 may be performed as shown in FIG. 5, in other embodiments the steps may be performed in a different order, or certain steps may occur simultaneously with one or more other steps.

Method 400 may begin at step 410, which involves using a receiver 30 to measure two distinct voltages induced by each separate transmitter 20. Step 420 involves, at receiver 30, maintaining a weighted accumulation of received voltages for each transmitter 20 according to the equation $V_{RCV}(m_0, n_0) = \Sigma_{k=1}^{N}(H(n_0, k)\Sigma_{n=1}^{N} V(m_0, n, k))$, where $V(m, n_0, k) = c_0(m, n_0) + d(n_0)H(n_0, k)\Delta(m, n_0)$, where $m_0$ is the receiver, $n_0$ is one transmitter, k is one of N measurement intervals, n is one of N transmitters, $c_0(m, n_0)$ is the average of the two measurably distinct voltages from transmitter $n_0$ at receiver m, $\Delta(m, n_0)$ is half of the difference of the two measurably distinct voltages from transmitter $n_0$ at receiver m, $d(n_0)$ is a signaling variable, and $H(n_0, k)$ is a value in a Hadamard matrix, where the rows of the Hadamard matrix represent the transmitters and the columns of the Hadamard matrix represent the measurement intervals, wherein a completed sum for each transmitter is received after the N measurement intervals.

Step 430 involves, at receiver 30, offsetting the completed sum for each transmitter 20 using a normalization term. In some embodiments, the normalization term is the same for $d(n_0)=1$ and for $d(n_0)=-1$. In some embodiments, the normalization term is determined according to the equation $V_{NORM}(m_0, n_0) = V_{RCV}(m_0, n_0) - (\Sigma_{n=1}^{N} c_0(m_0, n))\Sigma_{k=1}^{N} H(n_0, k)$. Step 440 involves, at each receiver 30, decoding one or more bits received from each transmitter 20 using the offset completed sum for each respective transmitter 20.

Some or all of the steps of method 400 may be stored on a non-transitory computer readable storage medium, wherein the steps are represented by computer readable programming code. The steps of method 400 may also be computer-implemented using a programmable device, such as a computer-based system. Method 400 may comprise instructions that, when loaded into a computer-based system, cause the system to execute the steps of method 400. Method 400 may be implemented using various programming languages, such as "Java", "C", or "C++".

Various storage media, such as magnetic computer disks, optical disks, and electronic memories, as well as computer readable media and computer program products, can be prepared that can contain information that can direct a device, such as a micro-controller, to implement the above-described systems and/or methods. Once an appropriate device has access to the information and programs contained on the storage media, the storage media can provide the information and programs to the device, enabling the device to perform the above-described systems and/or methods.

For example, if a computer disk containing appropriate materials, such as a source file, an object file, or an executable file, were provided to a computer, the computer could receive the information, appropriately configure itself, and perform the functions of the various systems and methods outlined in the diagrams and flowcharts above to implement the various functions. That is, the computer could receive various portions of information from the disk relating to different elements of the above-described systems and/or methods, implement the individual systems and/or methods, and coordinate the functions of the individual systems and/or methods.

Many modifications and variations of the Wireless Polarization Modulation Method Using Polarization Shift Keying and Hadamard Multiplexing are possible in light of the above description. Within the scope of the appended claims, the embodiments of the systems described herein may be practiced otherwise than as specifically described. The scope of the claims is not limited to the implementations and the embodiments disclosed herein, but extends to other implementations and embodiments as may be contemplated by those having ordinary skill in the art.

I claim:

1. A method comprising the steps of:
in a wireless network comprising two or more transmitters each having a transmitting antenna and at least one receiver having a receiving antenna, wherein the transmitting antennas and the receiving antenna are oriented such that each transmitting antenna induces two measurably distinct voltages at the output of the receiving antenna by switching between two polarization states, separately measuring, using the receiver, the two measurably distinct voltages received from each separate transmitter;
at the receiver, maintaining a weighted accumulation of received voltages for each transmitter according to the equation $V_{RCV}(m_0, n_0) = \Sigma_{k=1}^{N}(H(n_0, k) \Sigma_{n=1}^{N} V(m_0, n, k))$, where $V(m, n_0, k) = c_0(m, n_0) + d(n_0) H(n_0, k) \Delta(m, n_0)$, where $m_0$ is the receiver, $n_0$ is one transmitter, k is one of N measurement intervals, n is one of N transmitters, $c_0(m, n_0)$ is the average of the two measurably distinct voltages from transmitter $n_0$ at receiver m, $\Delta(m, n_0)$ is half of the difference of the two measurably distinct voltages from transmitter $n_0$ at receiver m, $d(n_0)$ is a signaling variable, and $H(n_0, k)$ is a value in a Hadamard matrix, where the rows of the Hadamard matrix represent the transmitters and the columns of the Hadamard matrix represent the measurement intervals, wherein a completed sum for each transmitter is received after the N measurement intervals; and
at each receiver, offsetting the completed sum for each transmitter using a normalization term.

2. The method of claim 1, wherein the normalization term is the same for $d(n_0)=1$ and for $d(n_0)=-1$.

3. The method of claim 1, wherein the normalization term is determined according to the equation $$V_{NORM}(m_0, n_0) = V_{RCV}(m_0, n_0) - (\Sigma_{n=1}^{N} c_0(m_0, n)) \Sigma_{k=1}^{N} H(n_0, k).$$

4. The method of claim 1 further comprising the step of, at each receiver, decoding one or more bits received from each transmitter using the completed sum for each respective transmitter.

5. The method of claim 1, wherein the transmitting antennas and the receiving antennas each are configured to synchronize the switching of their polarizations.

6. The method of claim 1, wherein the two polarization states are linear polarization and right-hand circular polarization.

7. The method of claim 1, wherein the two polarization states are linear polarization and left-hand circular polarization.

8. A method comprising the steps of:
in a wireless network comprising two or more transmitters each having a transmitting antenna and at least one receiver having a receiving antenna, wherein the transmitting antennas and the receiving antenna are oriented such that each transmitting antenna induces two measurably distinct voltages at the output of the receiving antenna by switching between two polarization states and wherein the transmitting antennas and the receiving antennas each are configured to synchronize the switching of their polarizations, separately measuring, using the receiver, the two measurably distinct voltages received from each separate transmitter;
at the receiver, maintaining a weighted accumulation of received voltages for each transmitter according to the equation $V_{RCV}(m_0, n_0) = \Sigma_{k=1}^{N}(H(n_0, k) \Sigma_{n=1}^{N} V(m_0, n, k))$, where $V(m, n_0, k) = c_0(m, n_0) + d(n_0) H(n_0, k) \Delta(m, n_0)$, where $m_0$ is the receiver, $n_0$ is one transmitter, k is one of N measurement intervals, n is one of N transmitters, $c_0(m, n_0)$ is the average of the two measurably distinct voltages from transmitter $n_0$ at receiver m, $\Delta(m, n_0)$ is half of the difference of the two measurably distinct voltages from transmitter $n_0$ at receiver m, $d(n_0)$ is a signaling variable, and $H(n_0, k)$ is a value in a Hadamard matrix, where the rows of the Hadamard matrix represent the transmitters and the columns of the Hadamard matrix represent the measurement intervals, wherein a completed sum for each transmitter is received after the N measurement intervals;
at each receiver, offsetting the completed sum for each transmitter using a normalization term; and
at each receiver, decoding one or more bits received from each transmitter using the offset completed sum for each respective transmitter.

9. The method of claim 8, wherein the normalization term is the same for $d(n_0)=1$ and for $d(n_0)=-1$.

10. The method of claim 8, wherein the normalization term is determined according to the equation $$V_{NORM}(m_0, n_0) = V_{RCV}(m_0, n_0) - (\Sigma_{n=1}^{N} c_0(m_0, n)) \Sigma_{k=1}^{N} H(n_0, k).$$

11. The method of claim 8, wherein the two polarization states are linear polarization and right-hand circular polarization.

12. The method of claim 8, wherein the two polarization states are linear polarization and left-hand circular polarization.

13. A system comprising:
at least two transmitters each having a separate transmitting antenna and at least two receivers each having a separate receiving antenna, wherein the transmitting antennas and the receiving antennas are oriented such that each transmitting antenna induces two measurably distinct voltages at the output of each receiving antenna by switching between two polarization states, wherein the transmitting antennas and the receiving antennas each are configured to synchronize the switching of their polarizations, wherein the two measurably distinct voltages received from each separate transmitter are measured using each receiver, wherein a weighted accumulation of received voltages is maintained at each receiver for each transmitter according to the equation $$V_{RCV}(m_0, n_0) = \Sigma_{k=1}^{N}(H(n_0, k) \Sigma_{n=1}^{N} V(m_0, n, k)), \text{ where}$$

$V(m, n_0, k) = c_0(m, n_0) + d(n_0) H(n_0, k) \Delta(m, n_0)$, where $m_0$ is the receiver, $n_0$ is one transmitter, k is one of N measurement intervals, n is one of N transmitters, $c_0(m, n_0)$ is the average of the two measurably distinct voltages from transmitter $n_0$ at receiver m, $\Delta(m, n_0)$ is half of the difference of the two measurably distinct voltages from transmitter $n_0$ at receiver m, $d(n_0)$ is a signaling variable, and $H(n_0, k)$ is a value in a Hadamard matrix, where the rows of the Hadamard matrix represent the transmitters and the columns of the Hadamard matrix represent the measurement intervals, wherein a completed sum for each transmitter is received after the N measurement intervals, wherein each receiver offsets the completed sum for each transmitter using a normalization term.

14. The system of claim 13, wherein the normalization term is the same for $d(n_0)=1$ and for $d(n_0)=-1$.

15. The system of claim 13, wherein the normalization term is determined according to the equation $$V_{NORM}(m_0,n_0)=V_{RCV}(m_0,n_0)-(\Sigma_{n=1}^{N}c_0(m_0,n)).$$

16. The system of claim 13, wherein each receiver is further configured to decode one or more bits received from each transmitter using the offset completed sum for each respective transmitter.

17. The system of claim 13, wherein the two polarization states are selected from the group of polarizations comprising linear polarization, left-hand circular polarization, and right-hand circular polarization.

* * * * *